Aug. 17, 1965  G. H. PORATH  3,200,671
PRECISION QUILL-TYPE MACHINE TOOL SPINDLE
Filed Dec. 11, 1962  2 Sheets-Sheet 1
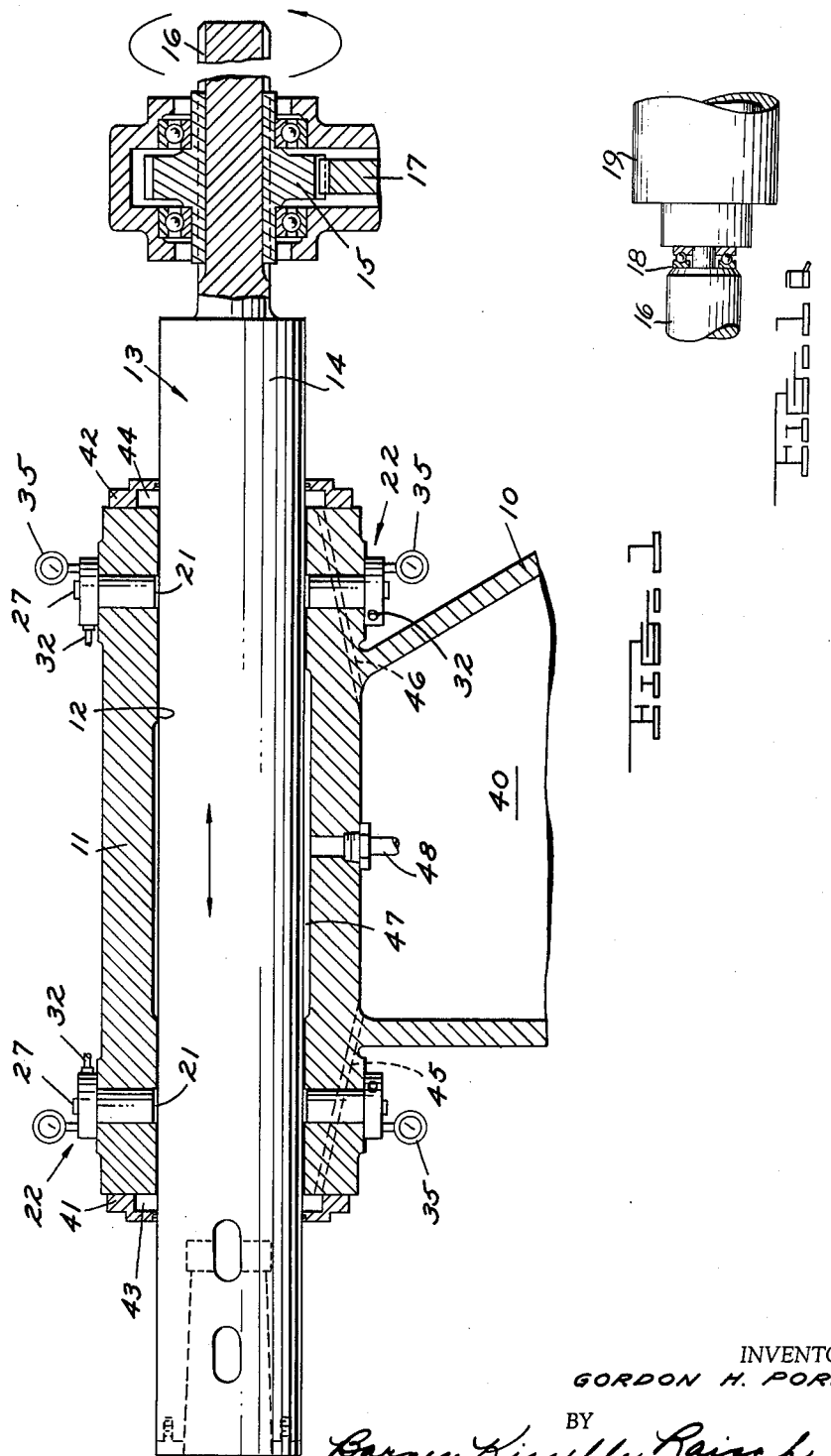
INVENTOR.
GORDON H. PORATH
BY
*Barnes, Kisselle, Raisch & Choate*
ATTORNEYS Aug. 17, 1965  G. H. PORATH  3,200,671
PRECISION QUILL-TYPE MACHINE TOOL SPINDLE
Filed Dec. 11, 1962  2 Sheets-Sheet 2
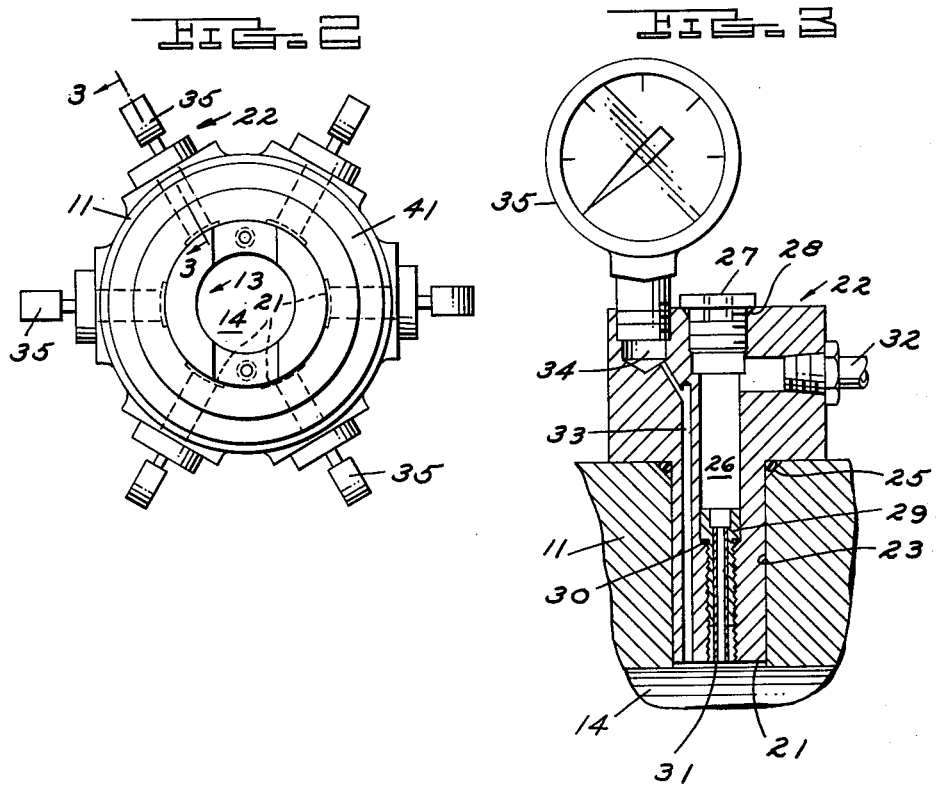
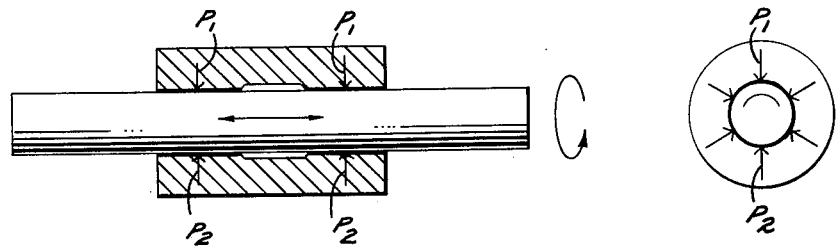
INVENTOR.
GORDON H. PORATH
ATTORNEYS

# United States Patent Office 3,200,671
Patented Aug. 17, 1965

3,200,671
PRECISION QUILL-TYPE MACHINE
TOOL SPINDLE
Gordon H. Porath, 6101 Concord, Detroit, Mich.
Filed Dec. 11, 1962, Ser. No. 243,870
5 Claims. (Cl. 77—5)

This application is a continuation-in-part of application Serial No. 173,532, filed February 15, 1962.

This invention relates to machine tool spindles and particularly to machine tool spindles for supporting a tool for rotary and reciprocating motion.

In various machine operations such as drilling, reaming, tapping and grinding and in machines such as jig borers, radial drills, boring mills, grinders and special machines, it is conventional to use what is commonly known as a quill-type spindle. Such a quill-type spindle comprises a housing in which a tubular quill is reciprocably mounted by either solid or by linear-type ball bearings. A spindle is, in turn, rotatably mounted in the quill by roller bearings for rotation only. In order to achieve longitudinal or reciprocating movement of the tool which is mounted on the spindle, the quill is moved relative to the housing. In order to obtain rotation of the tool, the spindle is rotated relative to the quill and the housing. The major problem in such quill-type spindles is that the bearings used between the quill and the housing and between the spindle and the quill are subject to metal-to-metal friction which is accentuated by geometrical inaccuracies, lack of rigidity, dissimilarities in the materials which cause Brinelling and misalignment, all of which tend to increase the metal-to-metal friction. As a result, in time substantial wear occurs between the parts so that the accuracy of the spindle is completely lost. Thus, it has been customary to utilize one quill-type spindle for rough operations and a different quill-type spindle for finishing operations. Quill-type spindles are also subject to vibration noise and deflections because of varying loads. Because substantial load may be placed on the tool, it is necessary to use hard materials which inherently have a high coefficient of heat expansion and, therefore, further loss in accuracy is caused when the quill or spindle heats up.

It is an object of this invention to provide a quill-type machine tool spindle wherein the axis of rotation of the spindle is controlled and stable at all speeds within accuracies many times greater than heretobefore obtained in quill-type spindles.

It is a further object of the invention to provide such a quill-type spindle which is accurate during the reciprocating motion and rotation in both directions.

It is a further object of the invention to provide such a quill-type spindle which utilizes pressurized liquid from an external source as the load supporting medium between the spindle and the housing and wherein the conventional tubular quill is eliminated.

It is a further object of the invention to provide such a quill-type spindle which has high and varying load carrying characteristics so that it can be used for both finish machining and rough machining without loss of accuracy.

It is a further object of the invention to provide such a quill-type spindle which is smooth and vibration free.

It is a further object of the invention to provide such a quill-type spindle which permits the rotary member to be made of materials having a low coefficient of heat expansion and thereby further increase the accuracy of the spindle.

It is a further object of the invention to provide such a quill-type spindle that can be operated at any r.p.m. in both directions without loss of accuracy.

It is a further object of the invention to provide such a quill-type spindle wherein inaccuracies in the machining of the parts are entirely compensated.

It is a further object of the invention to provide a quill-type machine tool spindle which requires less power to rotate the rotary member because sliding metal-to-metal friction is entirely eliminated.

Basically, the invention comprises providing a rotary member or combined quill and spindle member within a housing without the use of a conventional tubular quill. The housing is formed with a cylindrical opening and the rotary member extends through the opening and has a cylindrical configuration. The cylindrical opening in the housing is provided with longitudinally spaced sets of pockets or pressure pads along the inner surface thereof, each set of pads comprising a plurality of circumferentially spaced pads. Liquid under pressure from an external source is provided to each pad at a predetermined pressure through a metering device, preferably a capillary tube. The relative dimensions of the rotary member and the housing are such that the liquid in the pads and the area surrounding the pads supports the rotary member. Each capillary tube supplies liquid continuously at predetermined pressure to each pressure pad. The liquid flows in laminar fashion continuously in a thin low velocity film between the adjacent surfaces of the rotary member and housing, preferably in such a manner that the liquid dissipates its pressure by the time it reaches the edges of the surfaces. When the load radially on the tool and, in turn, the rotary member, increases, the rotary member tends to move toward one pad or pads so that the flow of liquid from these pads is restricted; since liquid is being supplied continuously to each pad, the pressure in the pads increases. At the same time, the rotary member tends to move away from an opposite pad or pads unrestricting the flow and the pressure in these pad or pads decreases. As a result, a pressure differential is created which tends to retain the rotary member in its original position. Because there is never any metal-to-metal contact, there is no wear on any of the parts. The arrangement not only provides for an accurate control of position of the rotary member but, in addition, compensates for inaccuracies in the formation of the surfaces on the spindle and housing.

In the drawings:

FIG. 1 is a longitudinal sectional view through a quill-type machine tool spindle embodying the invention.

FIG. 1a is a fragmentary view of the right end of the apparatus shown in FIG. 1.

FIG. 2 is an end view of the quill-type machine tool spindle embodying the invention.

FIG. 3 is a fragmentary sectional view taken along the line 3—3 in FIG. 2.

FIG. 4 is a diagrammatic longitudinal sectional view of the machine tool spindle embodying the invention.

FIG. 5 is a diagrammatic end view of the diagrammatic machine tool spindle shown in FIG. 4.

Referring to FIGS. 1 and 2, the quill-type machine tool spindle embodying the invention comprises a base 10 which supports a cylindrical body 11. Body 11 has a cylindrical opening 12 therein through which a cylindrical rotary member or combined quill and spindle 13 extends and is movable longitudinally and rotatably in both directions. The surface of the cylindrical opening 12 and the surface 14 of the rotary member 13 are accurately formed cylinders. The rotary member 13 is adapted to be rotated in any well-known manner as by gear 15 fixed to a spline 16 on a reduced end portion of the spindle and meshing with a drive gear 17. The rotary member is adapted to be moved longitudinally by any suitable mechanism such as a rotary coupling 18 and cylinder 19 (FIG. 1a). At its other end, spindle 13 is adapted to support a tool or similar device in a manner well known in the art.

At longitudinally spaced points along the cylindrical surface 12, a plurality of circumferentially spaced pads 21 are provided, each pressure pad constituing a depression in the surface 12. Liquid is supplied at predetermined pressure to each of the pads as presently described. Any viscous liquid such as machine oil is used and supplied at constant pressure to each presssure pad from an external pressure source by orifice or metering units 22. All metering units 22 are similar and, for purposes of clarity, only one metering unit will be described. Referring to FIG. 3, the body 11 includes a radial opening 23 and the metering unit extends into and substantially fills the opening 23, the lower portion of the opening 23 forming part of the pressure pad 21. An O-ring 24 in a recess 25 in the body 11 provides a seal between the metering unit 22 and the body 11.

The body of the orifice unit 22 includes a passageway 26 extending from the pad 21 through to the surface of the metering unit. A sealing plug 27 closes the end of the passageway, an O-ring 28 being interposed between the plug and the body of the orifice unit. An Allen head screw 29 is threaded into the base of the passageway 26 and an O-ring 30 is interposed between the head of the screw 29 and the body of the unit 22. Screw 29 supports a capillary tube 31 in position to provide an orifice for throttling the liquid and supplying it at predetermined pressure and volume to the pressure pad 21. The capillary tube 31 is mounted in an opening through screw 29 by silver soldering the tube at its ends to the screw 29. Liquid is supplied to the passage 26 through an inlet 32.

Metering unit 22 also includes a second passage 33 extending from the pad 21 parallel to the passageway 26 to a connecting opening 34 into which a pressure gauge 35 is threaded so that the pressure gauge at all times indicates the pressure in the pad 21. A metering unit 22 is provided for each pad 21 in the body 11.

The relative dimensions of the adjacent surfaces of the housing member 11 and the rotary member 13 are such that a laminar film of liquid flows continuously at low velocity between the surfaces and the pressure of the liquid drops to zero as it leaves the surfaces. The number and size of the pressure pads is such as to support the load on the rotary member 13 and will vary depending upon the size of the load to be supported. A minimum of three circumferentially spaced pads is required at at least two longitudinally spaced areas. The relative dimensions will also vary depending upon the size of the device.

The relative dimensions, however, are designed such that a thin film of liquid flows at all times in laminar fashion at low velocity between the adjacent surfaces and preferably substantially all of the pressure of the liquid is dissipated by the time the liquid has passed from the pad to the periphery of the surface in question.

The space between the surface of the opening 12 and the surface of the rotary member 13 is less than two thousandths (0.002) of an inch but preferably less than one thousandth (0.001) of an inch. In order to permit flow the space is not less than one ten thousandth (0.0001) of an inch. In larger quill-type spindles where machining limitations do not permit as accurate control of finishes, at least some portions of the space between the surface of the opening 12 and the surface of the rotary member 13 should be one thousandth (0.001) of an inch or less. However, when the rotary member is made to the same normal roundness tolerances used in making the races of precision roller bearing spindles and linear bearing quills, accurate results are achieved far exceeding the accuracy of such spindles and quills.

Use of capillary tubes for metering liquid flow has proved excellent. Fixed orifices, another good method, present several problems that are eliminated with capillary tubes. With a fixed orifice there is a tendency over a long period of time of the small sharp cornered metering holes to wear; whereas, in comparison, the long hole in a capillary tube never wears. Further, a considerably larger diameter hole can be used in a capillary tube because of the length, greatly relaxing filtering requirements. Finally, capillary tubes cancel any effects of change in viscosity of the liquid. In the formulas used to calculate the bearing, the viscosity of the fluid cancels out on both sides of the equations. This condition allows the use of any suitable liquid regardless of viscosity without changing bearing performance.

In order to provide for the return of the liquid to the reservoir 40 in base 10, peripheral seals 41, 42 are provided on the ends of body 11 and extend radially inwardly into contact with rotary member 13 to define annular collecting chambers 43, 44 to which the liquid flows. These chambers are drained to the reservoir 40 through drain passages 45, 46 in the base. An annular drain passage 47 is provided at the center of the opening 12 by cutting away a portion of the surface. Drain opening 48 extends from this space 47 to the reservoir 40. Where the rotary member 13 is operated generally vertically, the drain openings are appropriately positioned.

In designing the machine tool spindle embodying the invention, the pressure pads are so located relative to the adjacent surfaces that the liquid has substantially an equal distance to flow from the pad to the collecting area where it enters a drain chamber for draining back to the reservoir.

The provision of a low velocity laminar flow of liquid between the surfaces of the body 11 and rotary member 13 effectively eliminates any friction because there is no metal-to-metal contact and provides a quill-type machine tool spindle that will compensate for loads that are inadvertently applied thereon to thereby maintain a stable accurate axis of reciprocation and rotation.

The gauges 35 provide a visual indication at all times of the pressure in the pads. If a capillary should become clogged, the pressure will immediately drop to zero. The capillary can then be readily removed and cleaned. Gauges 35 also assist in checking the pressures in the pads during manufacture of the spindle. If the pressures in the pads of any set of pads are not equal, then the size of the capilaries can be changed to make certain that the pressures in the pads in that set are balanced. Varying the size of the hole or the length or both of the capillary tube changes the amount of liquid that passes through the tube with a resultant change of pressure in the pressure pad.

The manner of operation of the quill-type machine tool spindle can be more readily understood by referring to FIGS. 4 and 5. FIG. 4 represents the relative arrangement provided by the pressure pads 21. In the event that a thrust force is applied on the rotary member 13, for example, downwardly as shown in FIGS. 4 and 5, the pressure in the pads represented by the arrows $P_1$ increases because of the restriction action and the pressure in the opposed pads represented by the arrow $P_2$ decreases because of the unrestricted action so that a force is applied on the rotary member 13 upwardly tending to return the rotary member to its initial position. Because the quill-type spindles embodying the invention are designed with internal supporting pressures far in excess of applied loads and because of the minute clearance dimensions, it can be readily understoond that the relative movements herein described are very slight. In fact, they are so slight that they cannot be measured.

This arrangement not only compensates for varying forces on the rotary member due to varying loads on the tool, but, in addition, compensates for varying forces because of change in position of the rotary member 13 axially of the body 11 or utilization of the rotary member 13 at any angle. Moreover, the fully compensated flow accommodates for minor surface or machining inaccuracies that inherently occur in commercial machining practices, producing an ultra-precise, stable, smooth, vibration-free axis of rotation.

The quill-type machine tool spindle embodying the invention thereby provides a very accurate control of the axis of the spindle which has no wear thereon and will therefore maintain its accuracy indefinitely. The load carrying characteristics of the machine tool spindle including resistance to shock permits its use for both finish and rough machining work so that one spindle can serve the purposes of what have theretofore required a plurality of spindles. Loads which would normally damage machine tool spindles utilizing solid, or ball and roller bearings do not damage machine tool spindles embodying the invention.

Since there is no metal-to-metal contact, the parts can be made of a softer material to take advantage of the low coefficient of heat expansion of softer materials such as Invar. The spindle contruction permits accurate control of the temperature of the liquid, as by heat exchanger in the liquid circuit so that the spindle parts can be maintained at constant temperatures.

It can thus be seen that according to my invention, the rotary member comprises a combined quill and spindle. This not only eliminates the dual sets of bearings, but the use of the pressurized fluid system overcomes all the disadvantages inherent in solid or roller bearings. In addition, the rotary member can be made the same diameter as the quill in conventional quill-type spindles making the rotary member considerably larger than the spindle in a conventional quill-type unit so that a more rigid tool support is achieved.

What I claim is:

1. In a precision quill-type machine tool spindle, the combination comprising a housing having a cylindrical opening therethrough,
a spindle having a cylindrical portion extending through said opening.
said cylindrical portion of said spindle being longer than the cylindrical opening in said housing,
means on said spindle for engaging said spindle to rotate the spindle and move the spindle longitudinally of said housing,
means at one end of said spindle for supporting a tool,
said housing having at least two longitudinally spaced sets of pressure pads in the surface of said cylindrical opening,
each said set comprising a plurality of circumferentially spaced pressure pads,
an orifice associated with each pressure pad and communicating directly with its respective pressure pad,
means for supplying liquid under pressure to each said orifice,
the sizes of said orifices being such that the pressure of liquid in the pads of each set of pads is normally equal,
the relative dimensions of the surfaces of said cylindrical opening wherein said pads are positioned and said spindle being such that a pressurized film of liquid flows continuously between the surfaces through the pressure pads so that forces on the spindle are balanced by pressure in the pads providing a separation of the surfaces and retaining the spindle in a predetermined radial position relative to the housing throughout the rotational and longitudinal movement of the spindle relative to the housing.

2. The combination set forth in claim 1 including means adjacent each end of the housing and between the longitudinally spaced sets of pressure pads for collecting the liquid after passage through said pads and between said surfaces.

3. The combination set forth in claim 2 wherein said last mentioned means comprises annular seals at each end of the housing and drain passages extending from the area of said seals.

4. The combination set forth in claim 3 including means within said housing defining a reservoir, said drain passages extending to said reservoir.

5. The combination set forth in claim 1 wherein at least some portions of the space between the surface of said cylindrical opening and the surface of said cylindrical portion range between one thousandths (0.001) of an inch and one ten thousandths (0.0001) of an inch.

References Cited by the Examiner

UNITED STATES PATENTS

| 2,354,296 | 7/44 | Arms | 308—9 |
|---|---|---|---|
| 2,486,227 | 10/49 | Tydeman | 308—122 |
| 2,618,517 | 11/52 | Erikson et al. | 308—9 |
| 2,938,756 | 5/60 | Loeb | 308—122 |
| 3,030,744 | 4/62 | Mueller | 308—9 |

FOREIGN PATENTS

| 896,233 | 4/44 | France. |
|---|---|---|
| 687,371 | 2/53 | Great Britain. |
| 716,522 | 10/54 | Great Britain. |

WILLIAM W. DYER, Jr., *Primary Examiner.*

JOHN C. CHRISTIE, *Examiner.*